United States Patent
Jang

(10) Patent No.: US 10,939,983 B2
(45) Date of Patent: Mar. 9, 2021

(54) DENTAL IMPLANT UNIT

(71) Applicant: Jae Woo Jang, Seoul (KR)

(72) Inventor: Jae Woo Jang, Seoul (KR)

( * ) Notice: Subject to any disclaimer, the term of this patent is extended or adjusted under 35 U.S.C. 154(b) by 0 days.

(21) Appl. No.: 15/536,135

(22) PCT Filed: Dec. 16, 2014

(86) PCT No.: PCT/KR2014/012426
§ 371 (c)(1),
(2) Date: Jun. 15, 2017

(87) PCT Pub. No.: WO2016/098922
PCT Pub. Date: Jun. 23, 2016

(65) Prior Publication Data
US 2018/0014917 A1    Jan. 18, 2018

(30) Foreign Application Priority Data

Dec. 15, 2014  (KR) .......... 10-2014-0180541

(51) Int. Cl.
*A61C 8/00*        (2006.01)

(52) U.S. Cl.
CPC ............ *A61C 8/0086* (2013.01); *A61C 8/006* (2013.01); *A61C 8/0016* (2013.01);
(Continued)

(58) Field of Classification Search
CPC ... A61C 8/0086; A61C 8/0016; A61C 8/0022; A61C 8/0057; A61C 8/006;
(Continued)

(56) References Cited

U.S. PATENT DOCUMENTS 2,880,508 A * 4/1959 Lester ................ A61C 13/1026
433/169
3,827,145 A * 8/1974 Richards .............. A61C 8/0036
433/175
(Continued)

FOREIGN PATENT DOCUMENTS

KR    10-2008-0113949 A    12/2008
KR    10-2011-0131461 A    12/2011
(Continued)

OTHER PUBLICATIONS

Merriam-Webster Ring Definition. https://www.merriam-webster.com/dictionary/ring. (Year: 2013).*
(Continued)

*Primary Examiner* — Heidi M Eide
*Assistant Examiner* — Drew S Folgmann
(74) *Attorney, Agent, or Firm* — Park, Kim & Suh, LLC

(57) ABSTRACT

The present invention relates to an implant unit, particularly, a dental implant unit for mitigating impact which may be substituted for a natural tooth, the dental implant unit including: a crown; an abutment which has one side coupled to the crown; and a fixture which is coupled to the other side of the abutment, in which at least one of the abutment and the fixture has an elastic layer, and also relates to a dental implant unit including: a crown; an abutment which has one side coupled to the crown; and a fixture which is coupled to the other side of the abutment, in which at least one of the abutment and the fixture has an elastic layer that is formed at a portion which is in contact with a gingiva when an implant operation is performed using the dental implant unit.

8 Claims, 8 Drawing Sheets

(52) U.S. Cl.
CPC .......... *A61C 8/0022* (2013.01); *A61C 8/0057* (2013.01); *A61C 8/0065* (2013.01); *A61C 8/0069* (2013.01); *A61C 8/0074* (2013.01); *A61C 8/0078* (2013.01)

(58) Field of Classification Search
CPC ... A61C 8/0065; A61C 8/0069; A61C 8/0074; A61C 8/0078
See application file for complete search history.

(56) References Cited

U.S. PATENT DOCUMENTS

| | | | | |
|---|---|---|---|---|
| 4,252,525 | A * | 2/1981 | Child | A61C 8/0007 |
| | | | | 433/173 |
| 6,299,448 | B1 * | 10/2001 | Zdrahala | A61C 8/0006 |
| | | | | 433/173 |
| 2007/0105067 | A1 * | 5/2007 | Hayashi | A61C 8/0048 |
| | | | | 433/172 |
| 2007/0259311 | A1 | 11/2007 | Laux | |
| 2009/0123889 | A1 * | 5/2009 | Mehrhof | A61C 8/00 |
| | | | | 433/173 |

FOREIGN PATENT DOCUMENTS

| | | |
|---|---|---|
| KR | 10-2014-0029191 A | 3/2014 |
| KR | 10-1411071 B1 | 6/2014 |

OTHER PUBLICATIONS

International Search Report in International Appln. No. PCT/KR2014/012426 dated Jul. 17, 2015.

* cited by examiner

DENTAL IMPLANT UNIT

CROSS-REFERENCE TO RELATED APPLICATIONS

This application is the National Stage filing under 35 U.S.C. 371 of International Application No. PCT/KR2014/012426, filed on Dec. 16, 2014, which claims the benefits of Korean Patent Application No. 10-2014-0180541, filed on Dec. 15, 2014, the contents of which are all hereby incorporated by reference herein in their entirety.

TECHNICAL FIELD

The present invention relates to an implant unit, and more particularly, to a dental implant unit for mitigating impact which may be substituted for a natural tooth.

BACKGROUND ART

In general, an artificial tooth is a tooth which is artificially manufactured to have almost the same external shape and almost the same functionality as a natural tooth of a patient in place of the natural tooth which has a defect due to various reasons.

As the artificial tooth, prostheses or dentures are necessarily required to be implanted into an alveolar bone, but in this case, the prostheses or the dentures have many problems in view of a lifespan or inconvenience in use.

In contrast, a method of implanting the artificial tooth into the alveolar bone has merits in that the method exhibits an excellent effect in terms of the external shape and the functionality of the artificial tooth to such an extent that the artificial tooth cannot be easily distinguished from the natural tooth when the operation of implanting the artificial tooth is completed without damaging other natural teeth at the periphery of the artificial tooth, and the artificial tooth has a semipermanent lifespan in accordance with a maintenance condition, and as a result, a rate of use of the method recently tends to be rapidly increased.

In the method of implanting the artificial tooth into the alveolar bone, an implant unit is used.

FIG. 1 is an exploded perspective view illustrating an example of a general implant unit.

The implant unit widely includes a crown 1, an abutment 2, and a fixture 3.

The crown 1 is a tooth prosthesis which is used for mastication that is a basic function of the tooth, the fixture 3 corresponds to a tooth root that is inserted into and fixedly supported by the alveolar bone, and the abutment 2 serves as a bridge between the crown 1 and the fixture 3, and has one side coupled to the crown 1, and the other side coupled to the fixture 3.

The abutment 2 and the fixture 3, which constitute the implant unit, are made of metallic materials which are human-friendly and excellent in rigidity. Therefore, the abutment 2 and the fixture 3 are harmless to humans and also have excellent characteristics in terms of strength.

However, it is impossible to ensure flexibility against external force due to the physically excellent rigidity. For this reason, impact, which is caused by external force that occurs during mastication or any other actions, is transmitted as it is to the alveolar bone, which may result in pain.

It is normal for the natural teeth to minutely move in directions in which the natural teeth are misaligned when the maxilla and the mandible come together in accordance with mastication, but the abutment 2 and the fixture 3, which constitute the implant unit, form a very tight mechanical engagement so that even minute movement in an up and down direction or a lateral direction cannot be permitted. As described above, the implant unit does not permit minute movement involved with periodic mastication, and for this reason, impact (pulsating external force) due to the periodic mastication is consistently transmitted to the alveolar bone, which may result in pain.

SUMMARY OF THE INVENTION

Technical Problem

The present invention has been made in an effort to provide a dental implant unit for mitigating impact, which may especially mitigate impact transmitted by external force.

The present invention has also been made in an effort to provide a dental implant unit for mitigating impact, which may exhibit an ability that is biologically closest to that of a natural tooth by permitting minute movement, which is caused by external force, in an up and down direction or a lateral direction.

Technical Solution

An exemplary embodiment of the present invention provides a dental implant unit including: a crown; an abutment which has one side coupled to the crown; and a fixture which is coupled to the other side of the abutment, in which at least one of the abutment and the fixture has an elastic layer.

The elastic layer may be made of the same material as the abutment or the fixture.

The elastic layer may be formed as an elastic spring that is made of the same material as the abutment or the fixture.

The elastic layer may include a core which is made of the same material as the abutment or the fixture, and a soft membrane which is formed to surround the core.

The soft membrane may be made of silicone.

The elastic layer may be formed on a header of the fixture, and the header may be a portion that is exposed to the outside of an alveolar bone to be in contact with a gingiva when the fixture is implanted into the alveolar bone.

The elastic layer may be formed on a cuff of the abutment, and the cuff may be a portion that is in contact with a gingiva, which surrounds an alveolar bone, when the abutment is coupled to the fixture and the crown.

The elastic layer may be formed on the abutment, and formed on an exposed portion except for a coupling portion when the abutment is coupled to the crown and the fixture.

The elastic layer may be formed on the fixture, and formed on an exposed portion except for an implanted portion when the fixture is implanted into an alveolar bone.

Another exemplary embodiment of the present invention provides a dental implant unit including: a crown; an abutment which has one side coupled to the crown; and a fixture which is coupled to the other side of the abutment, in which at least one of the abutment and the fixture has an elastic layer that is formed at a portion which is in contact with a gingiva when an implant operation is performed using the dental implant unit.

Yet another exemplary embodiment of the present invention provides a dental implant unit including: a crown; and an implant structural body which has one side coupled to the crown, and the other side implanted from a gingiva to an alveolar bone, in which the implant structural body has an elastic layer.

The elastic layer may be formed at a portion of the implant structural body which is in contact with the gingiva when an implant operation is performed using the dental implant unit.

The dental implant unit may further include a soft membrane which is formed to surround the elastic layer.

Advantageous Effects

According to the present invention, the elastic layer is provided on the abutment, the fixture, or the implant structural body in which the abutment and the fixture are integrally implemented, such that it is possible to permit a minute movement, which is caused by external force due to mastication and the like, in an up and down direction or in a lateral direction, thereby providing a realistic feel of a natural tooth.

Any impact (pulsating external force) caused by external force is not transmitted to the alveolar bone, thereby removing pain that is caused after an implant operation is performed.

Meanwhile, the dental implant unit according to the present invention may be easily applied to an implant operation for other bone tissue in addition to the teeth.

DETAILED DESCRIPTION

Figure 1:
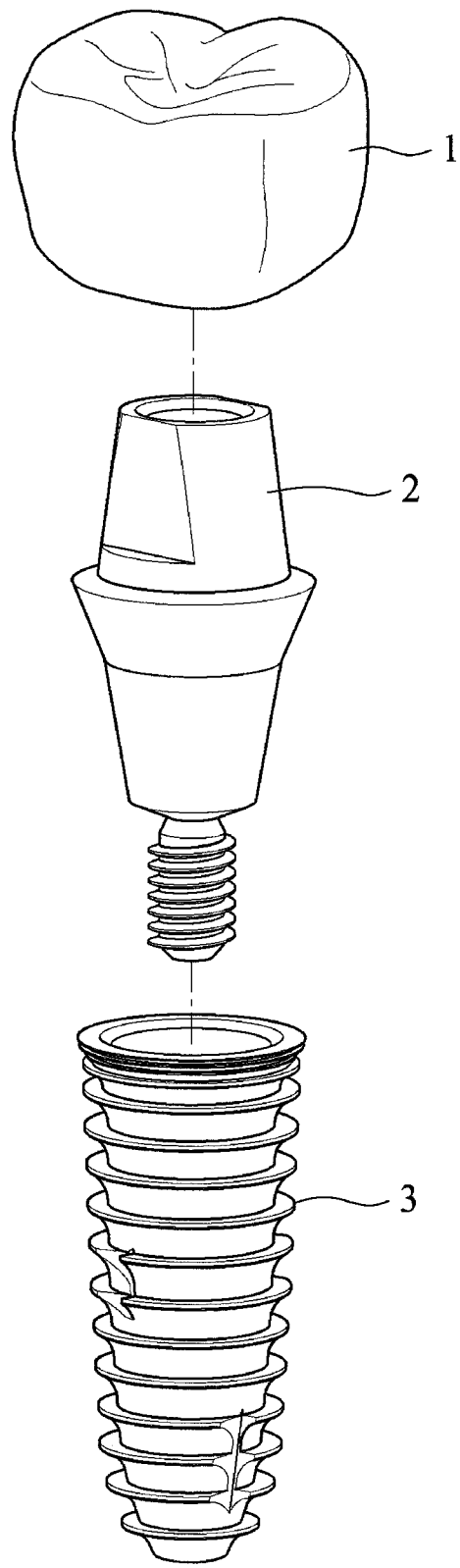
FIG. 1 is an exploded perspective view illustrating an example of a general implant unit.

Other objects, features and advantages of the present invention will become apparent upon reading of the following detailed description of the exemplary embodiments along with the accompanying drawings.

Hereinafter, configurations and operations of the exemplary embodiments of the present invention will be described with reference to the accompanying drawings, the configurations and the operations of the present invention, which are illustrated in the drawings and described with reference to the drawings, will be described as at least one exemplary embodiment, and the technical spirit of the present invention and the key configurations and operations of the present invention will not be limited by the exemplary embodiment.

Hereinafter, exemplary embodiments of a dental implant unit according to the present invention will be described in detail with reference to the accompanying drawings.

Figure 2:
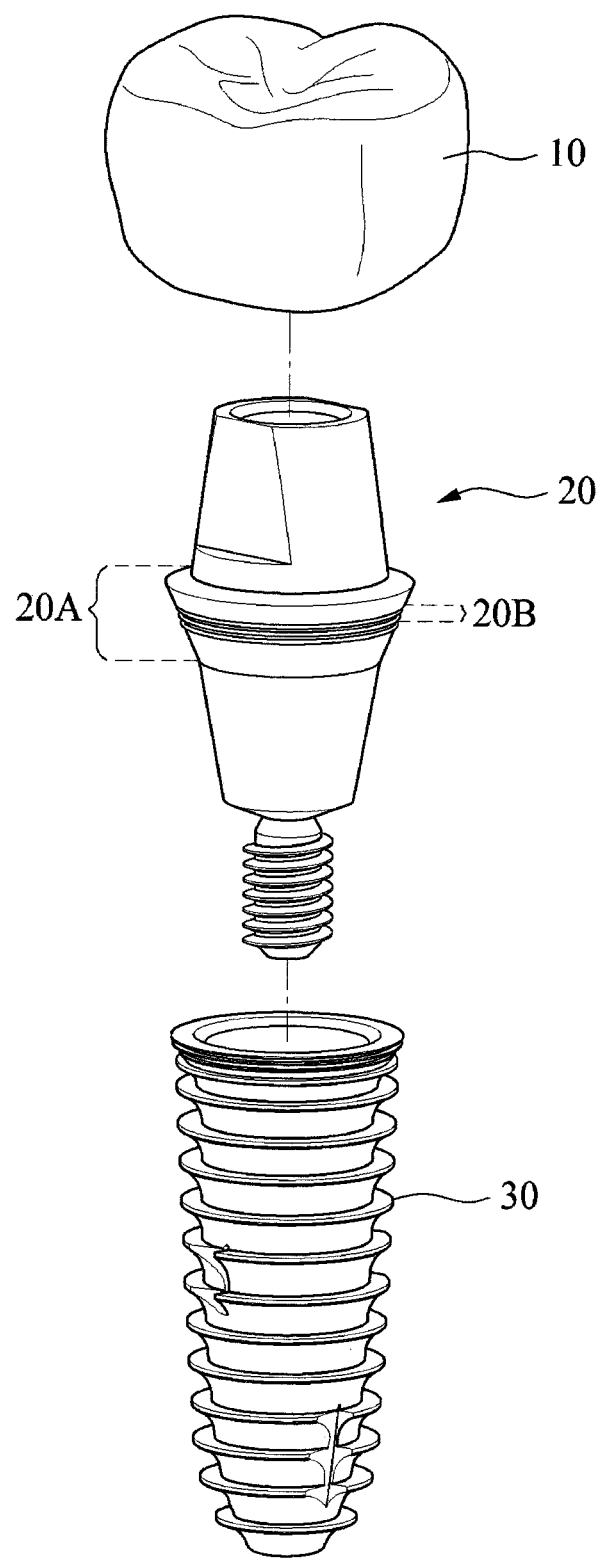
FIG. 2 is an exploded perspective view illustrating a configuration of an implant unit according to an exemplary embodiment of the present invention.

FIG. 2 is an exploded perspective view illustrating a configuration of an implant unit according to an exemplary embodiment of the present invention.

The implant unit according to the present invention may widely include a crown 10, an abutment 20, and a fixture 30.

The crown 10 is a tooth prosthesis which is used for mastication that is a basic function of the tooth, the fixture 30 corresponds to a tooth root that is inserted into and fixedly supported by an alveolar bone, and the abutment 20 serves as a structural interface between the crown 10 and the fixture 30, and has one side coupled to the crown 10, and the other side coupled to the fixture 30.

The abutment 20 and the fixture 30 are structural bodies which are implanted from the gingiva to the alveolar bone while being coupled to the crown 10, and the abutment 20 and the fixture 30 may be configured to be separated as illustrated in the present invention, or may also be configured as an implant structural body in which the abutment 20 and the fixture 30 are integrally formed.

The present invention will be described based on a structure in which the abutment 20 and the fixture 30 are configured to be separated, but the present invention is not limited thereto, and a dental implant unit, which includes an implant structural body (in which the abutment and the fixture are integrally coupled to each other) that has one side coupled to the crown 10 and the other side implanted from the gingiva to the alveolar bone, should also be considered.

In particular, in a case in which the implant structural body is divided into the abutment 20 and the fixture 30 as illustrated in FIGS. 2 to 6, at least one of the abutment 20 and the fixture 30 has an elastic layer 20B, and the implant structural body in which the abutment 20 and the fixture 30 are integrally formed may also have the elastic layer 20B.

In the separate-type implant structural body and the integrated-type implant structural body, the elastic layer 20B may be provided at a portion which is in contact with the gingiva after the dental implant unit is implanted.

The abutment 20 and the fixture 30, which constitute the dental implant unit, are made of metallic materials which are human-friendly and excellent in rigidity. Therefore, the abutment 20 and the fixture 30 are harmless to humans and also have excellent characteristics in terms of strength. In one example, the abutment 20 and the fixture 30 may be made of human-friendly pure metals such as gold, silver, cobalt, nickel, chromium, titanium, and zirconium, or alloys or minerals. For example, the abutment 20 and the fixture 30 may be made of a titanium alloy or zirconia that is an oxide of zirconium.

Various types of dental implant units may be provided in accordance with the shapes of the abutment 20 and the fixture 30.

Figure 3:
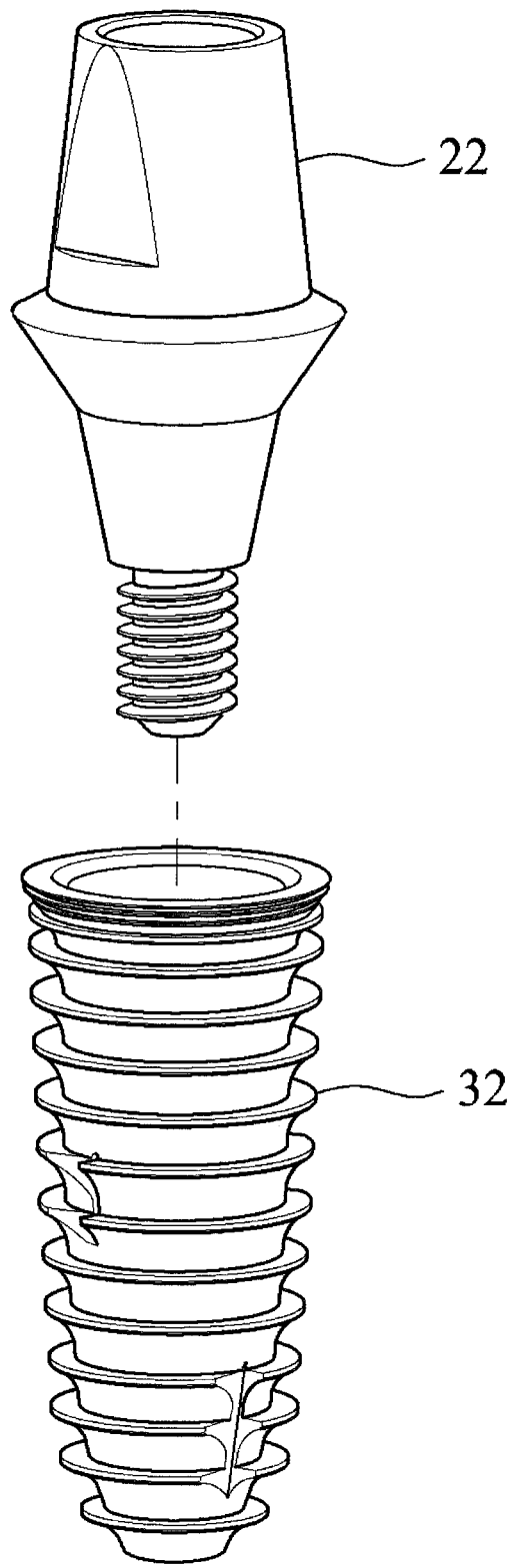
FIGS. 3 to 5 are exploded perspective views illustrating various shapes of the implant unit to which an elastic layer according to the present invention may be applied.
Figure 4:
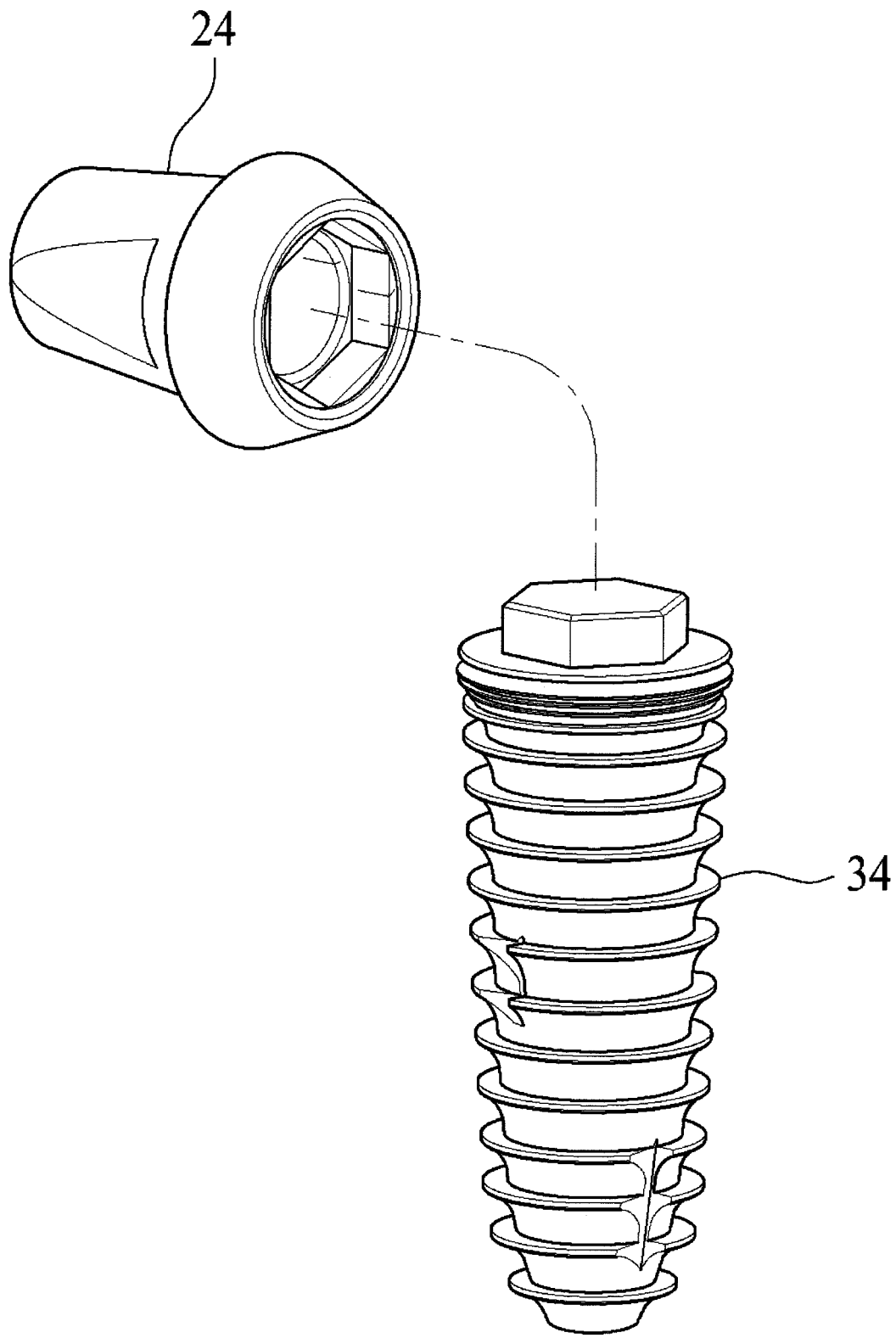
Figure 5:
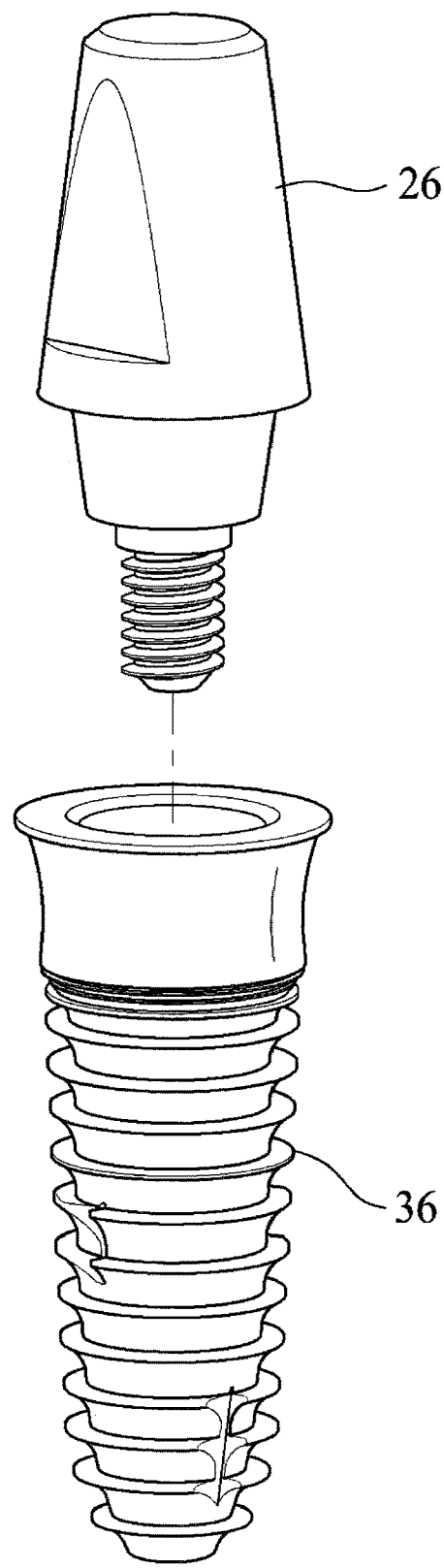

FIGS. 3 to 5 are exploded perspective views illustrating various shapes of the implant unit to which the elastic layer according to the present invention may be applied.

The fixture is implanted into the alveolar bone, and coupled to the alveolar bone so as to form an artificial tooth root. In accordance with the shape of the fixture 30, the fixture 30 may be classified into a first-type fixture 32 which is entirely implanted into the alveolar bone (see FIG. 3), a second-type fixture 34 which has an upper portion that partially protrudes and is inserted into a coupling groove of an abutment 24 when the second-type fixture 34 is coupled to the abutment 24 after the second-type fixture 34 is implanted into the alveolar bone (see FIG. 4), and a third-type fixture 36 which is partially implanted into the alveolar bone and has an upper portion that protrudes from the alveolar bone so as to be in contact with the gingiva (see FIG. 4).

Depending on the first to third types of the fixtures, the abutment may be classified into various types.

A first-type abutment 22 illustrated in FIG. 3 is divided into a lower portion which is thread-coupled to the fixture 32, and an upper portion to which the crown is coupled, and has a cuff that is provided between the lower portion and the upper portion. In the first-type dental implant unit, the elastic layer 20B according to the present invention may be positioned at a portion which is in contact with the gingiva after the first-type dental implant unit is completely implanted. Therefore, in the first-type dental implant unit, the elastic layer 20B is provided to be included in the cuff.

The second-type abutment 24 illustrated in FIG. 4 has a structure that allows the upper portion of the fixture 34 to be inserted into the coupling groove of the second-type abutment 24, and has an upper portion to which the crown is coupled, and a cuff which is in direct contact with the fixture 34, unlike the first-type abutment 22. Even in the second-type dental implant unit, the elastic layer 20B according to the present invention may be positioned at a portion which is in contact with the gingiva after the second-type dental implant unit is completely implanted, and as a result, the elastic layer 20B is provided to be included in the cuff.

Like the first-type abutment 22, a third-type abutment 26 illustrated in FIG. 5 is divided into a lower portion which is thread-coupled to the fixture 36, and an upper portion to which the crown is coupled, and has a cuff that is provided between the lower portion and the upper portion. In the third-type dental implant unit, the elastic layer 20B according to the present invention may be positioned at a portion which is in contact with the gingiva after the third-type dental implant unit is completely implanted, and as a result, the elastic layer 20B may be provided to be included in the cuff, or the elastic layer 20B may be provided to be included in the upper portion of the fixture 36 which protrudes from the alveolar bone.

As described above, in the present invention, the elastic layer 20B, which is provided to permit a minute movement, which is caused by external force, in an up and down direction or in a lateral direction, is provided on the separate-type implant structural body or the integrated-type implant structural body. In particular, the elastic layer 20B may be provided at a portion which is in contact with the gingiva when the dental implant unit is implanted.

Figure 6:
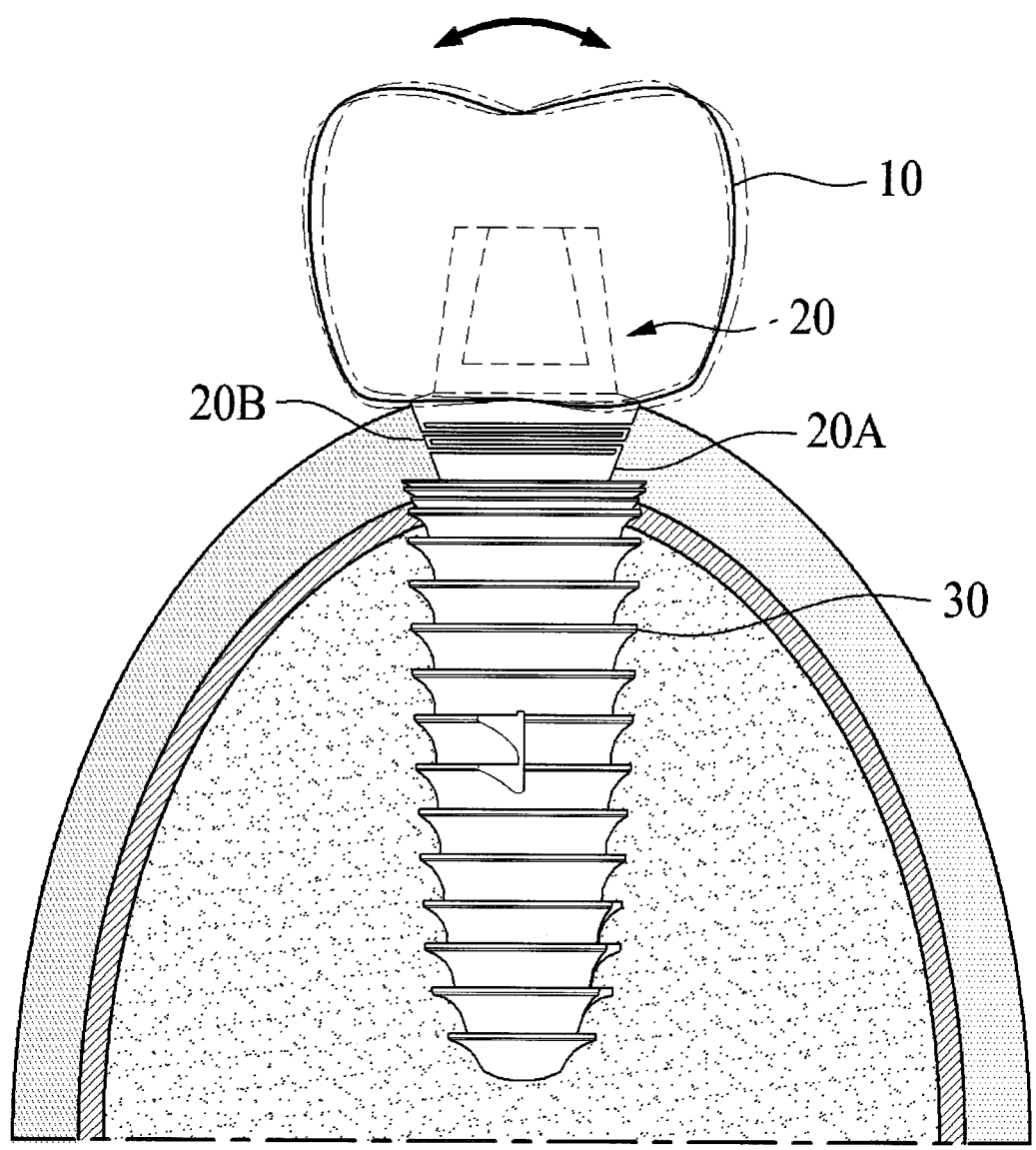
FIG. 6 is a cross-sectional view for explaining an implanting structure of the implant unit and an operational example of the elastic layer according to the exemplary embodiment of the present invention.

FIG. 6 is a cross-sectional view for explaining an implanting structure of the implant unit and an operational example of the elastic layer according to the exemplary embodiment of the present invention.

Referring to FIG. 6, when the fixture 30 is implanted into the alveolar bone, and the abutment 20 is coupled to the fixture 30, a cuff 20A of the abutment 20 is positioned in the gingiva, and the elastic layer 20B is provided on the cuff 20A with which the gingiva is in contact.

The elastic layer 20B serves to absorb impact caused by a minute movement in the up and down direction or in the lateral direction when external force caused by mastication and the like is transmitted from the crown 10.

Since the elastic layer 20B is provided on at least one of the abutment 20 and the fixture 30 or the integrated-type implant structural body, the elastic layer 20B may be made of the same material as the abutment 20, the fixture 30, or the implant structural body. In particular, the elastic layer 20B may be formed as an elastic spring that is made of the same material as the abutment 20, the fixture 30, or the implant structural body, and the elastic spring may be a compressive coil spring. Here, the compressive coil spring has a fine pitch to prevent excessive deviation in the lateral direction, thereby allowing the implant structural body to be operated to correspond to a lateral movement of the natural tooth.

Figure 7:
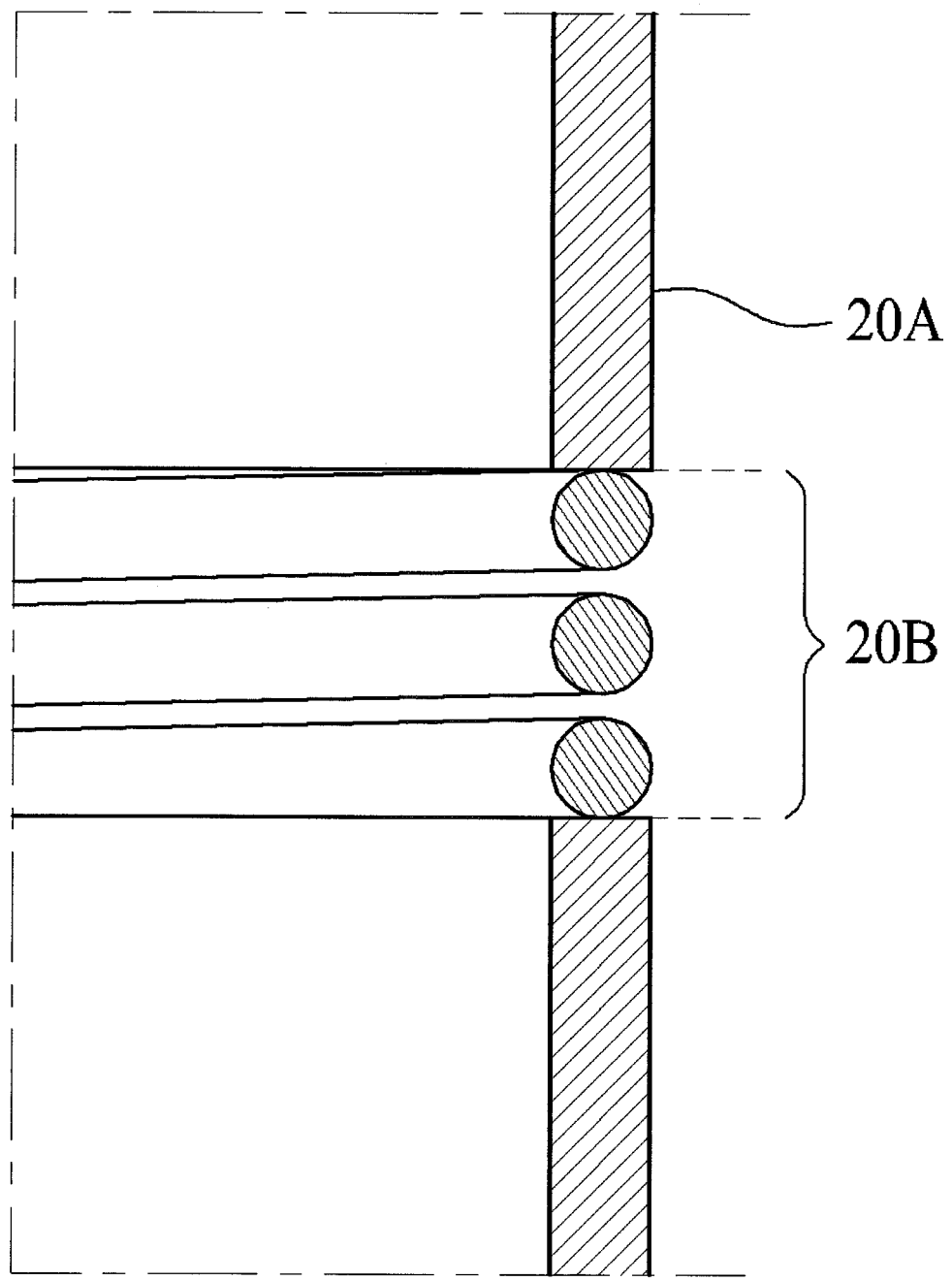
FIG. 7 is a cross-sectional view illustrating an example of the elastic layer of the implant unit according to the present invention.

FIG. 7 is a cross-sectional view illustrating an example of the elastic layer of the implant unit according to the present invention, and illustrating an example in which the elastic layer 20B, which is implemented as an elastic spring, has a fine pitch.

Meanwhile, the elastic layer 20B is provided at a portion which is in contact with the gingiva, and as a result, there is no concern that foreign substances enter the elastic layer 20B due to mastication. However, in order to prevent a situation in which foreign substances are caught by a portion with a fine pitch, the following structure illustrated in FIG. 8 may be used.

Figure 8:
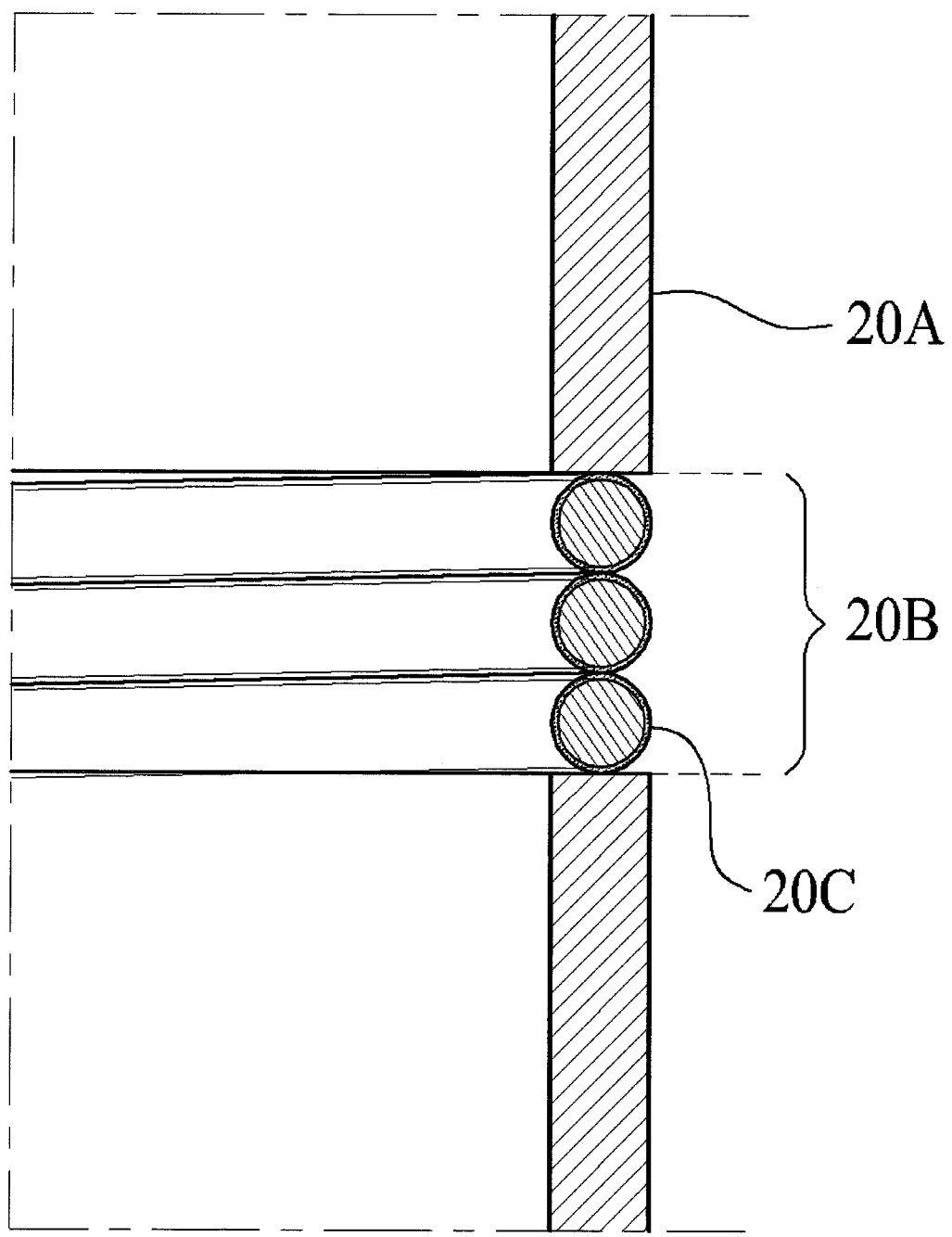
FIG. 8 is a cross-sectional view illustrating another example of the elastic layer of the implant unit according to the present invention.

FIG. 8 is a cross-sectional view illustrating another example of the elastic layer of the implant unit according to the present invention.

Referring to FIG. 8, in a case in which the elastic layer 20B is configured as an elastic spring that is made of the same material as the abutment 20, the fixture 30, or the implant structural body, the elastic layer 20B may include a core which is made of the same material as the abutment 20, the fixture 30, or the implant structural body, and a soft membrane 20C which is formed to surround the core. Here, the soft membrane 20C may be made of silicone, but the material of the soft membrane 20C is not limited to silicone.

In particular, the portion of the elastic layer 20B illustrated in FIG. 7, which has a fine pitch, is filled with the soft membrane 20C, and as a result, the elastic layer 20B, which is surrounded by the soft membrane 20C, is configured without having a fine pitch. Although the portion having a fine pitch is filled with the soft membrane 20C, the elastic layer 20B may serve to absorb impact caused by a minute movement, which is caused by external force, in the up and down direction or in the lateral direction, by soft characteristics of the soft membrane 20C.

Meanwhile, a thickness of a horizontal cross section of the elastic layer 20B which includes the soft membrane 20C and the core may be equal to a thickness of a horizontal cross section of the abutment or the fixture on which the elastic layer 20B is provided.

Hereinafter, examples of positions at which the elastic layer 20C is formed in accordance with the first to third types of fixtures will be described.

Regarding the position at which the elastic layer 20C is formed, the elastic layer 20C may be formed on at least one of the abutment and the fixture, or may be formed on the implant structural body in which the abutment and the fixture are integrally configured. In addition, the elastic layer 20C may be formed at a portion, among the abutment, the fixture, and the implant structural body, which is in contact with the gingiva when an implant operation is performed.

In the first-type dental implant unit illustrated in FIG. 3 and in the second-type dental implant unit illustrated in FIG. 4, the elastic layers 20C are formed on the abutments 22 and 24, and the elastic layer 20C may be formed on an exposed portion except for a coupling portion when the abutments 22 and 24 are coupled to the crowns and the fixtures 32 and 34. Each of the abutments 22 and 24 has a cuff, and the cuff corresponds to the exposed portion except for the coupling portion. Therefore, the elastic layers 20C are formed on the cuffs of the abutments 22 and 24. Here, the cuffs are portions which are in contact with the gingiva that surrounds the alveolar bone when the abutments 22 and 24 are coupled to the fixtures 32 and 34 and the crowns, respectively.

In the third-type dental implant unit illustrated in FIG. 5, the elastic layer 20C is formed on the fixture 36, and the elastic layer 20C may be formed on an exposed portion except for an implanted portion when the fixture 36 is implanted into the alveolar bone. The fixture 36 has a header which protrudes from the alveolar bone and is in contact with the gingiva, and the elastic layer 20C is formed on the header of the fixture 36. Here, the header is a portion which is exposed to the outside of the alveolar bone so as to be in contact with the gingiva when the fixture 36 is implanted into the alveolar bone, and does not have a screw-thread shape.

MODE FOR INVENTION

In the above description, the exemplary embodiments of the present invention have been described, but those with ordinary skill in the art to which the present invention pertains may variously modify the present invention without departing from the essential features of the present invention.

Thus, it should be appreciated that the embodiments of the present invention described herein are intended to be illustrative, and not restrictive, the scope of the present invention is defined by the claims rather than the aforementioned description, and it should be appreciated that all of the differences included within the scope equivalent to the claims belong to the present invention.

INDUSTRIAL APPLICABILITY

The dental implant unit of the present invention facilitates implant treatment for other bone tissues other than teeth.

What is claimed is:

1. A dental implant unit comprising:
   a crown;
   a fixture configured to be coupled to an alveolar bone;
   an abutment configured to connect the crown and the fixture, the abutment including:
   a top portion inserted into the crown;
   a bottom portion inserted into the fixture; and
   a cuff disposed between the top portion and the bottom portion and configured to contact a gingiva, the cuff comprising a tube member which is hollow;
   a core provided to the cuff of the abutment and made of the same material as the abutment, the core comprising a wire spirally wound and stacked about a central axis of the abutment; and
   a soft membrane surrounding an entire surface of the wire, wherein the cuff of the abutment includes:
   an upper hollow portion connected to the top portion of the abutment and configured to directly contact the gingiva; and
   a lower hollow portion spaced apart from the upper hollow portion in a vertical direction, connected to the bottom portion of the abutment, and configured to directly contact the gingiva,
   wherein the core and the soft membrane are interposed between the upper and lower hollow portions of the cuff to connect the upper and lower hollow portions of the cuff.

2. The dental implant unit of claim 1, wherein the soft membrane is made of silicone.

3. The dental implant unit of claim 1, wherein the soft membrane is configured to fill clearances formed between stacked portions of the wire.

4. The dental implant unit of claim 1, wherein a top end of the core faces a bottom end of the upper hollow portion of the cuff to be coupled thereto, and a bottom end of the core faces a top end of the lower hollow portion of the cuff to be coupled thereto.

5. The dental implant unit of claim 1, wherein the core has a diameter corresponding to a diameter of the cuff.

6. The dental implant unit of claim 1, wherein a total thickness of the wire and the soft membrane thereon in the core is the same as a thickness of a wall of the hollow tube member in the cuff.

7. The dental implant unit of claim 1, wherein the core has a vacant central portion which communicates with the hollow tube member of the cuff.

8. The dental implant unit of claim 1, wherein the cuff has a truncated and inverted cone shape.

* * * * *